United States Patent
Pamley et al.

(10) Patent No.: US 10,002,585 B2
(45) Date of Patent: Jun. 19, 2018

(54) SELECTIVELY TRANSMITTING SIGNALS

(71) Applicant: LENOVO (Singapore) PTE. LTD., New Tech Park (SG)

(72) Inventors: Marc Richard Pamley, Durham, NC (US); Omar Ali Ali, Morrisville, NC (US); George O. Diatzikis, Apex, NC (US); Alan Ladd Painter, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 140 days.

(21) Appl. No.: 15/087,561

(22) Filed: Mar. 31, 2016

(65) Prior Publication Data

US 2017/0287435 A1    Oct. 5, 2017

(51) Int. Cl.
*G09G 5/00* (2006.01)
*G06F 13/42* (2006.01)

(52) U.S. Cl.
CPC ......... *G09G 5/006* (2013.01); *G06F 13/4282* (2013.01); *G09G 2370/00* (2013.01)

(58) Field of Classification Search
None
See application file for complete search history.

(56) References Cited

U.S. PATENT DOCUMENTS

| | | | | |
|---|---|---|---|---|
| 6,125,454 A * | 9/2000 | Mossner | ............. | G06F 11/00 714/4.4 |
| 2007/0180174 A1* | 8/2007 | Moosavi | ............. | G06F 13/385 710/106 |
| 2009/0125743 A1* | 5/2009 | Robertson | ............. | G06F 1/266 713/324 |
| 2012/0091823 A1* | 4/2012 | Wu | ............. | G06F 1/3215 307/125 |
| 2013/0278552 A1* | 10/2013 | Kamin-Lyndgaard | . | G09G 5/006 345/174 |
| 2017/0055031 A1* | 2/2017 | Park | ............. | G06F 13/4059 |

* cited by examiner

*Primary Examiner* — Elias Mamo
(74) *Attorney, Agent, or Firm* — Kunzler, PC

(57) ABSTRACT

For selectively transmitting signals, a data lane interface communicates signals of at least one data lane of a serial bus. A video interface port receives a video display signal from a video card. A traffic circuit transmits the signals of the at least one data lane and the video display signal to a high-speed signal combiner in response to determining that the high-speed signal combiner is processing the signals of the at least one data lane and the video display signal for output as a combined video display signal. Else the traffic circuit transmits the video display signal to a video output port in response to determining that the high-speed signal combiner is not processing the signals of the at least one data lane and the video display signal for output as the combined video display signal.

20 Claims, 5 Drawing Sheets

SELECTIVELY TRANSMITTING SIGNALS

FIELD

The subject matter disclosed herein relates to transmitting signals and more particularly relates to selectively transmitting signals.

BACKGROUND

Description of the Related Art

Many data ports require high bandwidth signals.

BRIEF SUMMARY

An apparatus for selectively transmitting signals is disclosed. The apparatus includes a data lane interface, a video interface port, and a traffic circuit. The data lane interface communicates signals of at least one data lane of a serial bus. The video interface port receives a video display signal from a video card. The traffic circuit transmits the signals of the at least one data lane and the video display signal to a high-speed signal combiner in response to determining that the high-speed signal combiner is processing the signals of the at least one data lane and the video display signal for output as a combined video display signal. Else the traffic circuit transmits the video display signal to a video output port in response to determining that the high-speed signal combiner is not processing the signals of the at least one data lane and the video display signal for output as the combined video display signal. A method and system also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
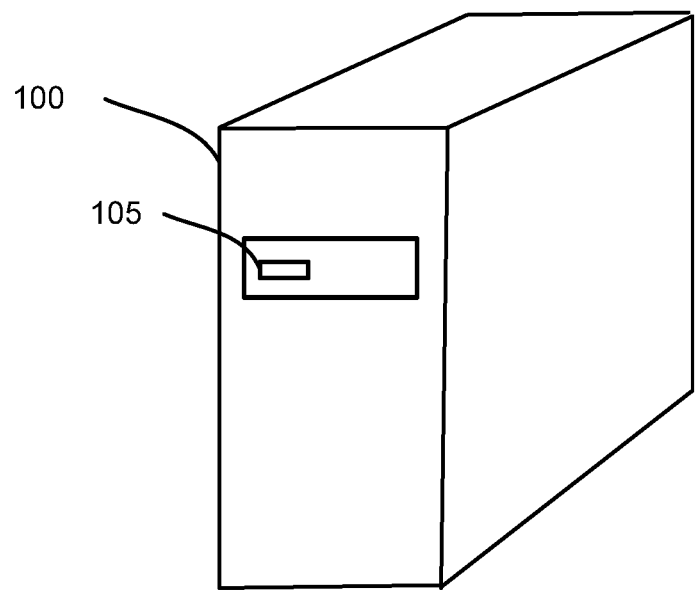
FIG. 1A is a perspective drawing illustrating one embodiment of a computer chassis.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of a computer chassis 100. A front of the computer chassis 100 is shown. In the depicted embodiment, the computer chassis includes an input/output (I/O) port 105. In one embodiment, the I/O port 105 may be a Universal Serial Bus (USB) Type-C x2 port. The I/O port 105 may be an interface for a high-speed signal combiner. The high-speed signal combiner may conform to a standard selected from the group consisting of a THUNDERBOLT 1 standard, a THUNDERBOLT 2 standard, and a THUNDERBOLT 3 standard.

Figure 1B:
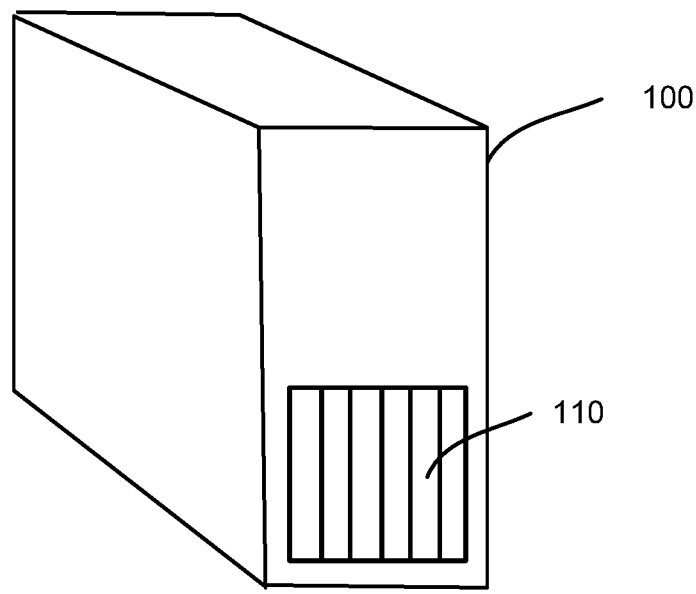
FIG. 1B is a perspective drawing illustrating one alternate embodiment of a computer chassis.

FIG. 1B is a perspective drawing illustrating one alternate embodiment of the computer chassis 100. A back of the computer chassis 100 is shown. In the depicted embodiment, a plurality of expansion bus slots 110 are shown. In one embodiment, the expansion bus slots 110 are Peripheral Component Interconnect Express (PCIe) expansion bus slots.

Typically, high-speed signal combiners are disposed within the chassis 100 a short distance from an integrated video controller and/or high-speed data lanes. As a result, receiving a video display signal and/or signals of a data lane are relatively easy because of the short distance that the signals must travel.

Unfortunately, when video display signals are generated in a video card disposed in one of the expansion bus slots 110, the distance between the video card and the high-speed signal combiner may be too far for the high-speed video display signals to be economically transmitted. In addition, the high-speed signal combiner may require data lanes from a bus that may also be too far for economical transmission from the expansion bus slots 110 to the high-speed signal combiner.

The embodiments described herein interface with and transmit data lanes of a serial bus and a video display signal to the high-speed signal combiner. In addition, the embodiments determine whether the high-speed signal combiner is processing data lane signals and the video display signal and routes the signals as will be described hereafter.

Figure 1C:
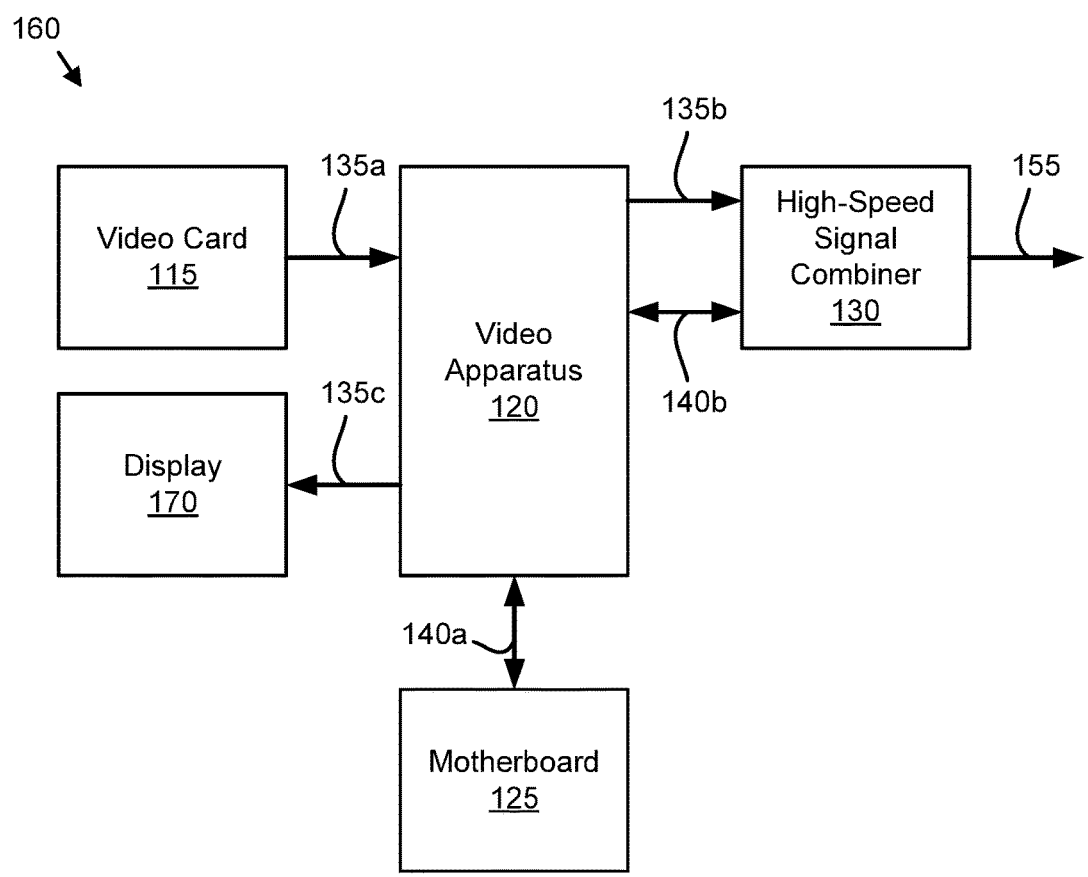
FIG. 1C is a schematic block diagram illustrating one embodiment of a signal transmission system.

FIG. 1C is a schematic block diagram illustrating one embodiment of a signal transmission system 160. In the depicted embodiment, the signal transmission system 160 includes a video card 115, a display 170, a video apparatus 120, a motherboard 125, and the high-speed signal combiner 130.

The video card 115 may be disposed in an expansion bus slot 110. The video card may generate a video display signal 135a and communicate the video display signal 135a to the video apparatus 120. In one embodiment, the video display signal 135a is communicated via a cable between the video card 115 and the video apparatus 120.

The video apparatus 120 may also be disposed in an expansion bus slot 110. The video apparatus 120 may receive the video display signal 135a. The video apparatus 120 may further communicate with a motherboard 125 via data lanes of a serial bus 140a. The serial bus 140a may be a PCIe serial bus. In one embodiment, the serial bus 140a is a PCIe3 serial bus. The video apparatus 120 may further provide the video display signal 135b and the data lanes of the serial bus 140b to the high-speed signal combiner 130.

The video apparatus 120 may determine whether the high-speed signal combiner 130 is processing the video display signal 135b and signals of the data lanes of the serial bus 140b. If the high-speed signal combiner 130 is processing the video display signal 135b and signals of the data lanes of the serial bus 140b, the video apparatus 120 may transmit the video display signal 135b and signals of the data lanes of the serial bus 140b to the high-speed signal combiner 130 for output as a combined video display signal 155. However, if the high-speed signal combiner 130 is not processing the video display signal 135b and signals of the data lanes of the serial bus 140b, the video apparatus 120 may transmit the video display signal 135c through a video output port to a display 170. As a result, the video display signal 135b and signals of the data lanes of the serial bus 140b are available to the high-speed signal combiner 130 if needed by the high-speed signal combiner 130, but otherwise are available for the display 170 through a video output port.

The high-speed signal combiner 130 may combine the video display signal 135b and signals of the data lanes of the serial bus 140b. In one embodiment, the combined video display signal 155 and the signals of the at least one data lane conform to a standard selected from the group consisting of a THUNDERBOLT 1 standard, a THUNDERBOLT 2 standard, and a THUNDERBOLT 3 standard.

Figure 2:
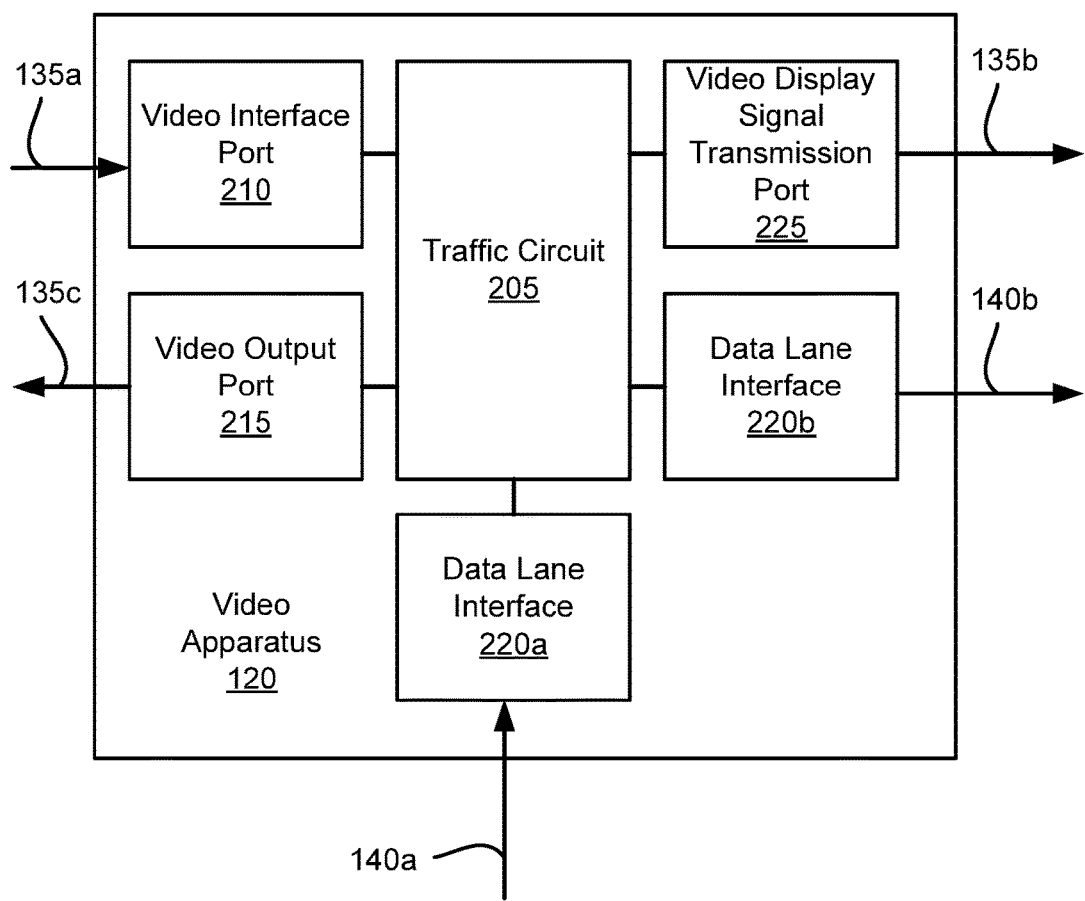
FIG. 2 is a schematic block diagram illustrating one embodiment of a video apparatus.

FIG. 2 is a schematic block diagram illustrating one embodiment of the video apparatus 120. In the depicted embodiment, the video apparatus 120 includes a video interface port 210, the video output port 215, a traffic circuit 205, one or more data lane interfaces 220, and a video display signal transmission port 225. The video apparatus 120 may be implemented using semiconductor gates on one or more semiconductor substrates.

The video interface port 210 may receive the video display signal 135a. The video interface port 210 may be selected from the group consisting of a DisplayPort (DP) and a Mini DisplayPort (MDP). The video interface port 210 may communicate the video display signal 135a to the traffic circuit 205.

The traffic circuit 205 may also communicate via the first data lane interface 220a with one or more data lanes of the serial bus 140a. The traffic circuit 205 may also determine whether the high-speed signal combiner 130 is processing the video display signal 135b and the signals of the data lanes of the serial bus 140b.

If the high-speed signal combiner 130 is processing the video display signal 135b and the signals of the data lanes of the serial bus 140b for output as a combined video display signal 155, the traffic circuit 205 may transmit the video display signal 135b via the video display signal transmission port 225 and the signals of the data lanes of the serial bus 140b via a second data lane interface 220b to the high-speed signal combiner 130.

In one embodiment, the traffic circuit 205 also conditions the video signal 135b and the signals of the data lanes of the serial bus 140b. The traffic circuit 205 may condition the video signal 135b and the signals of the data lanes of the serial bus 140b by applying one or more of an active filter, a low-pass filter, a high pass filter, or combinations thereof. The conditioning may improve the signal-to-noise ratio of the video signal 135b and the signals of the data lanes of the serial bus 140b so that the signals do not degrade prior to reaching the high-speed signal combiner 130.

If the high-speed signal combiner 130 is not processing the video display signal 135b and the signals of the data lanes of the serial bus 140b, the traffic circuit 205 may transmit the video display signal 135c via the video output port 205.

Figure 3:
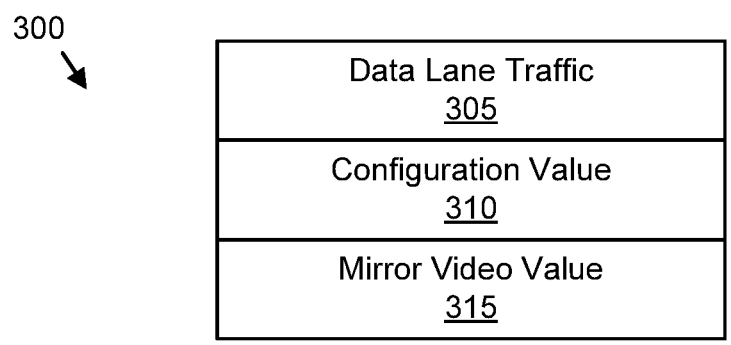
FIG. 3 is a schematic block diagram illustrating one embodiment of video data.

FIG. 3 is a schematic block diagram illustrating one embodiment of video data 300. The video data 300 may be used to determine if the high-speed signal combiner 130 is processing the video display signal 135b and the signals of the data lanes of the serial bus 140b. The video data 300 may be stored as one or more data words in registers of the traffic circuit 205, the motherboard 125, or combinations thereof.

In one embodiment, the video data 300 includes data lane traffic 305, a configuration value 310, a mirror video value 315. The data lane traffic 305 may indicate if the data lanes of the serial bus 140a are communicating signals. Asserting the data lane traffic 305 may indicate that serial bus traffic is detected on the at least one data lane.

The configuration value 310 may indicate if the high-speed signal combiner 130 is configured to process the video display signal 135b and the signals of the data lanes of the serial bus 140b. The configuration value 310 may indicate that the high-speed signal combiner 130 is configured to process the video display signal 135b and the signals of the data lanes of the serial bus 140b if the configuration value 310 is asserted. The configuration value 310 may be set by firmware of the motherboard 125, an operating system, firmware of the high-speed signal combiner 130, or the like.

The mirror video value 315 may be asserted to indicate that the video display signal 135c should be transmitted through the video output port 215 even if the high-speed signal combiner 130 is processing the signals of the at least one data lane and the video display signal 135b. The mirror video value 315 may be set by firmware of the motherboard 125, an operating system, firmware of the high-speed signal combiner 130, or the like. Alternatively, the mirror video value 315 may be asserted in response to detecting a video device in communication with the video output port 215.

Figure 4:
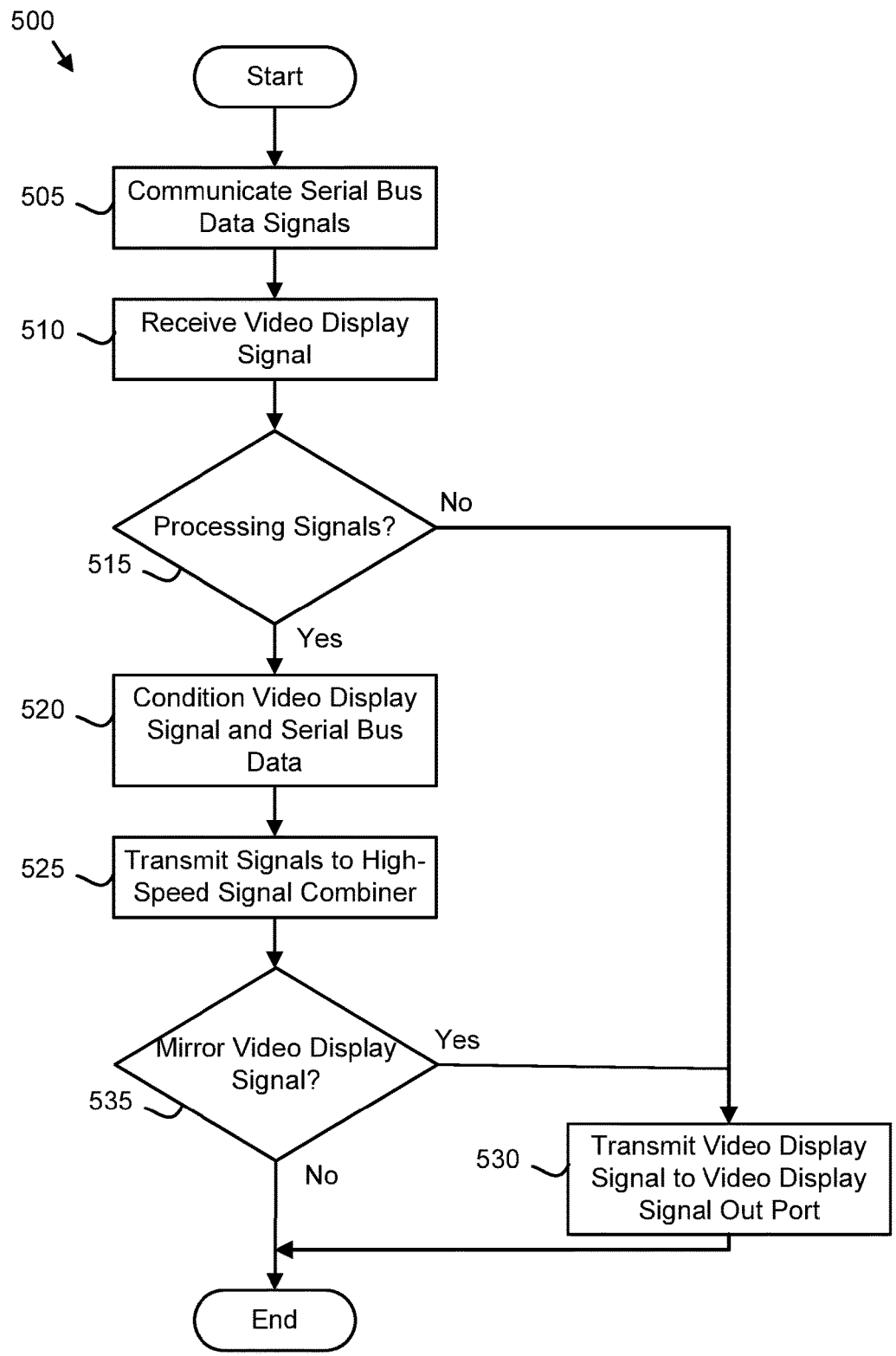
FIG. 4 is a schematic flow chart diagram illustrating one embodiment of a transmission selection method.

FIG. 4 is a schematic flow chart diagram illustrating one embodiment of a transmission selection method 500. The method 500 may transmit the video display signal 135b and the signals of the data lanes of the serial bus 140b to the high-speed signal combiner 130 if the high-speed signal combiner 130 is processing the video display signal 135b and the signals of the data lanes of the serial bus 140b for output as a combined video display signal 155. The method 500 may be performed by the video apparatus 120.

The method 500 starts, and in one embodiment, the first data lane interface 220a communicates 505 the signals of at least one data lane of the serial bus 140a. In addition, the video interface port 210 may receive 510 the video display signal 135a from the video card 115.

The traffic circuit 205 may determine 515 if the high-speed signal combiner 130 is processing the video display signal 135b and the signals of the data lanes of the serial bus 140b for output as a combined video display signal 155. In one embodiment, the traffic circuit 205 samples the at least one data lane and asserts the data lane traffic 305 if the at least one data lane is communicating valid data signals via the data lane interfaces 220a-b. If serial bus traffic is detected on the at least one data lane, the traffic circuit 205 may determine 515 that the high-speed signal combiner 130 is processing the video display signal 135b and the signals of the data lanes of the serial bus 140b.

Alternatively, the traffic circuit 205 may determine 515 if the high-speed signal combiner 130 configured to process the video display signal 135b and the signals of the data lanes of the serial bus 140b from the configuration value 310. The traffic circuit 205 may determine 515 that the high-speed signal combiner 130 is configured to process the video display signal 135b and the signals of the data lanes if the configuration value 310 is asserted.

If the traffic circuit 205 determines 515 that the high-speed signal combiner 130 is not processing the video display signal 135b and the signals of the data lanes of the serial bus 140b, the traffic circuit 205 may transmit 530 the video display signal 135c to the video output port 215 and the method 500 ends. The video display signal 135c may be available to drive the display 170.

If the traffic circuit 205 determines 515 that the high-speed signal combiner 130 is processing the video display signal 135b and the signals of the at least one data lane of the serial bus 140b, the traffic circuit 205 may condition 520 the video display signal 135b and the signals of the at least one data lane. In addition, the traffic circuit 205 may transmit 525 the signals of the at least one data lane and the video display signal 135b to the high-speed signal combiner 130.

The traffic circuit 205 may determine 535 whether to mirror the video display signal 135c through the video output port 215. In one embodiment, the traffic circuit 205 determines 535 to mirror the video display signal 135c if a video device is connected to the video output port 215. In a certain embodiment, the traffic circuit 205 determines 535 to mirror the video display signal 135c if the mirror video value 315 is asserted. If the traffic circuit 205 determines 535 not to mirror the video display signal 135c, the method 500 ends. If the traffic circuit 205 determines 535 to mirror the video display signal 135c, the traffic circuit 205 may transmit 530 the video display signal 135c to the video output port 215 and the method 500 ends. If the traffic circuit 205 determines 535 to mirror the video display signal 135c, the signaling format and resolution may be set by the video device attached to the high speed signal combiner 130, and may not be altered by any device attached to the video output port 215.

The embodiments provide the signals of the data lanes of the serial bus 140 and the video display signal 135 to the high-speed signal combiner 130. In addition, the signals of the data lanes of the serial bus 140 and the video display signal 135 may only be provided to the high-speed signal combiner 130 if the high-speed signal combiner 130 is processing the signals of the data lanes of the serial bus 140 and the video display signal 135. As a result, signals required by the high-speed signal combiner 130 may be provided from a video card 115 in an expansion slot 110. If the high-speed signal combiner 130 is not processing the signals of the data lanes of the serial bus 140 and the video display signal 135, the embodiments may transmit the video display signal 135 to the video output port 215. Alternatively, the embodiments may determine to mirror the video display signal 135c through the video output port 215. The video display signal 135c may be available even if the high-speed signal combiner 130 is processing the signals of the data lanes of the serial bus 140 and the video display signal 135. As a result, the video display signal 135 may also be available at the expansion slots 110.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a data lane interface that communicates signals of at least one data lane of a serial bus;
a video interface port that receives a video display signal from a video card; and
a traffic circuit that samples the at least one data lane and determines that a high-speed signal combiner is processing signals of the at least one data lane and the video display signal for output as a combined video display signal if the at least one data lane is communicating valid data signals and transmits the signals of the at least one data lane and the video display signal to the high-speed signal combiner in response to determining that the high-speed signal combiner is processing the signals of the at least one data lane and the video display signal for output as a combined video display signal, else the traffic circuit transmits the video display signal to a video output port in response to determining that the high-speed signal combiner is not processing the signals of the at least one data lane and the video display signal for output as the combined video display signal.

2. The apparatus of claim 1, wherein the traffic circuit determines that the high-speed signal combiner is processing the signals of the at least one data lane and the video display signal for output by detecting serial bus traffic on the at least one data lane.

3. The apparatus of claim 1, wherein the traffic circuit determines that the high-speed signal combiner is processing the signals of the at least one data lane and the video display signal for output from a video/data configuration flag value.

4. The apparatus of claim 1, wherein the traffic circuit further conditions the signals of the at least one data lane and the video display signal, wherein the conditioned signals do not degrade prior to the reaching the high-speed signal combiner.

5. The apparatus of claim 1, wherein the serial bus is a Peripheral Component Interconnect Express 3 (PCIe-3) serial bus.

6. The apparatus of claim 1, wherein the video interface port is selected from the group consisting of a DisplayPort (DP) and a Mini DisplayPort (MDP).

7. The apparatus of claim 1, wherein the combined video display signal and the signals of the at least one data lane conform to a standard selected from the group consisting of a THUNDERBOLT 1 standard, a THUNDERBOLT 2 standard, and a THUNDERBOLT 3 standard.

8. A method comprising:
communicating signals of at least one data lane of a serial bus through a data lane interface;
receiving a video display signal from a video card through a video interface port;
sampling the at least one data lane;
determining that a high-speed signal combiner is processing signals of the at least one data lane and the video display signal for output as a combined video display signal if the at least one data lane is communicating valid data signals; and
transmitting the signals of the at least one data lane and the video display signal to the high-speed signal combiner in response to determining that the high-speed signal combiner is processing the signals of the at least one data lane and the video display signal for output as a combined video display signal, else transmitting the video display signal to a video output port in response to determining that the high-speed signal combiner is not processing the signals of the at least one data lane and the video display signal for output as the combined video display signal.

9. The method of claim 8, wherein the method determines that the high-speed signal combiner is processing the signals of the at least one data lane and the video display signal for output by detecting serial bus traffic on the at least one data lane.

10. The method of claim 8, wherein the method determines that the high-speed signal combiner is processing the signals of the at least one data lane and the video display signal for output from a video/data a configuration flag value.

11. The method of claim 8, wherein the method further conditions the signals of the at least one data lane and the video display signal, wherein the conditioned signals do not degrade prior to reaching the high-speed signal combiner.

12. The method of claim 8, wherein the serial bus is a Peripheral Component Interconnect Express 3 (PCIe-3) serial bus.

13. The method of claim 8, wherein the video interface port is selected from the group consisting of a DisplayPort (DP) and a Mini DisplayPort (MDP).

14. The method of claim 8, wherein the combined video display signal and the signals of the at least one data lane conform to a standard selected from the group consisting of a THUNDERBOLT 1 standard, a THUNDERBOLT 2 standard, and a THUNDERBOLT 3 standard.

15. A system comprising:
a motherboard;
a high-speed signal combiner;
a data lane interface that communicates signals of at least one data lane of a serial bus of the motherboard;
a video interface port that receives a video display signal from a video card; and
a traffic circuit that samples the at least one data lane and determines that a high-speed signal combiner is processing signals of the at least one data lane and the video display signal for output as a combined video display signal if the at least one data lane is communicating valid data signals and transmits the signals of the at least one data lane and the video display signal to the high-speed signal combiner in response to determining that the high-speed signal combiner is processing the signals of the at least one data lane and the video display signal for output as a combined video display signal, else the traffic circuit transmits the video display signal to a video output port in response to determining that the high-speed signal combiner is not processing the signals of the at least one data lane and the video display signal for output as the combined video display signal.

16. The system of claim 15, wherein the traffic circuit determines that the high-speed signal combiner is processing the signals of the at least one data lane and the video display signal for output by detecting serial bus traffic on the at least one data lane.

17. The system of claim 15, wherein the traffic circuit determines that the high-speed signal combiner is processing the signals of the at least one data lane and the video display signal for output from a video/data configuration flag value.

18. The system of claim 15, wherein the traffic circuit further conditions the signals of the at least one data lane and the video display signal, wherein the conditioned signals do not degrade prior to reaching the high-speed signal combiner.

19. The system of claim 15, wherein the traffic circuit further transmits the signals of the at least one data lane and the video display signal to the high-speed signal combiner and mirrors the video display signal to the video output port in response to determining that the high-speed signal combiner is processing the signals of the at least one data lane and the video display signal for output as a combined video display signal and determining that a video device is connected to the video output port.

20. The system of claim 15, wherein the traffic circuit further transmits the signals of the at least one data lane and the video display signal to the high-speed signal combiner and mirrors the video display signal to the video output port in response to determining that the high-speed signal combiner is processing the signals of the at least one data lane and the video display signal for output as a combined video display signal and a mirror video value is asserted.

* * * * *